United States Patent
Zheng et al.

(10) Patent No.: US 12,501,280 B2
(45) Date of Patent: Dec. 16, 2025

(54) UPDATING PUCCH SPATIAL RELATION INFORMATION

(71) Applicant: QUALCOMM Incorporated, San Diego, CA (US)

(72) Inventors: Ruiming Zheng, Beijing (CN); Yan Zhou, San Diego, CA (US); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/793,373

(22) PCT Filed: Dec. 1, 2020

(86) PCT No.: PCT/CN2020/133035
§ 371 (c)(1),
(2) Date: Jul. 15, 2022

(87) PCT Pub. No.: WO2021/143380
PCT Pub. Date: Jul. 22, 2021

(65) Prior Publication Data
US 2023/0055588 A1  Feb. 23, 2023

(30) Foreign Application Priority Data
Jan. 19, 2020 (WO) ................ PCT/CN2020/072985

(51) Int. Cl.
*H04W 16/28* (2009.01)
*H04W 52/36* (2009.01)
*H04W 80/02* (2009.01)

(52) U.S. Cl.
CPC ......... *H04W 16/28* (2013.01); *H04W 52/367* (2013.01); *H04W 80/02* (2013.01)

(58) Field of Classification Search
None
See application file for complete search history.

(56) References Cited

U.S. PATENT DOCUMENTS

| 11,949,517 B2 * | 4/2024 | Guan ............... H04B 7/088 |
| 2019/0174466 A1 | 6/2019 | Zhang et al. |

(Continued)

FOREIGN PATENT DOCUMENTS

| CN | 109923828 A | 6/2019 |
| CN | 110535601 A | 12/2019 |

(Continued)

OTHER PUBLICATIONS

Samsung: "Reduction of Signaling and Latency for Beam Managements," 3GPP TSG-RAN WG2 Meeting #108, R2-1915248, 3rd Generation Partnership Project, Mobile Competence Centre, 650, Route Des Lucioles, F-06921, Sophia-Antipolis Cedex, France, vol. RAN WG2, No. Reno, US, Nov. 18, 2019-Nov. 22, 2019, Nov. 8, 2019, XP051817114, 8 pages, section 2.

Samsung: "Reduction of Signaling and Latency for Beam Managements," 3GPP TSG-RAN WG2 Meeting #108, R2-1915248, Reno, US, Nov. 18-22, 2019, 8 Pages.

(Continued)

*Primary Examiner* — Luna Weissberger
(74) *Attorney, Agent, or Firm* — Procopio, Cory, Hargreaves & Savitch LLP

(57) ABSTRACT

The present disclosure relates to methods and devices for wireless communication including a UE and a base station. The UE can receive a MAC CE indicating an update to a spatial relation configuration of the UE for PUCCH transmissions. In some aspects, the update can be indicated by PUCCH resource information, where the PUCCH resource information can include first PUCCH resource information including a first PUCCH resource ID that identifies a first PUCCH resource and first spatial identification information. Additionally, the UE can update the spatial relation configuration of the UE based on at least one of the first PUCCH resource information or other PUCCH resource information (Continued)

of the PUCCH resource information, where the other PUCCH resource information can be in a same PUCCH resource group as the first PUCCH resource. Also, the UE can transmit a PUCCH transmission based on the updated spatial relation configuration.

27 Claims, 12 Drawing Sheets

(56) References Cited

U.S. PATENT DOCUMENTS

| | | | |
|---|---|---|---|
| 2019/0268893 A1 | 8/2019 | Tsai et al. | |
| 2019/0364602 A1* | 11/2019 | Yi | H04W 74/0833 |
| 2022/0094510 A1* | 3/2022 | Zhang | H04L 5/0023 |
| 2022/0393840 A1* | 12/2022 | Määttanen | H04L 5/001 |

FOREIGN PATENT DOCUMENTS

| | | |
|---|---|---|
| WO | 2019141146 A1 | 7/2019 |
| WO | 2019190377 A1 | 10/2019 |

OTHER PUBLICATIONS

Supplementary European Search Report—EP20913169—Search Authority—Munich—Feb. 15, 2024.
ZTE: "Enhancements on Multi-Beam Operation", R1-1911931, 3GPP TSG RAN WG1 Meeting #99, 3rd Generation Partnership Project, Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 9, 2019, XP051823112, 18 Pages, sections 2, 2.1 and 2.3.
CMCC: "Enhancements on Multi-Beam Operation", 3GPP TSG RAN WG1 #99, R1-1912543, Reno, USA, Nov. 18-22, 2019, Nov. 9, 2019 (Nov. 9, 2019), 4 pages, the whole document.
Ericsson: "New MAC CE for Indicating Spatial Resource for PUCCH Resources". 3GPP TSG-RAN WG2 #108, R2-1914713, Reno, USA, Nov. 18-22, 2019, Nov. 22, 2019 (Nov. 22, 2019), 4 pages.
International Search Report and Written Opinion—PCT/CN2020/072985—ISA/EPO—Oct. 22, 2020.
International Search Report and Written Opinion—PCT/CN2020/133035—ISA/EPO—Feb. 20, 2021.

* cited by examiner

| | Oct 401 | Oct 402 | Oct 403 | Oct 404 | | Oct N |
|---|---|---|---|---|---|---|
| | | | $S_0$ | $S_8$ | | $S_{(N-3)\times 8}$ |
| | BWP ID 430 | | $S_1$ | $S_9$ | | $S_{(N-3)\times 8+1}$ |
| | | PUCCH Resource ID 440 | $S_2$ | $S_{10}$ | | $S_{(N-3)\times 8+2}$ |
| | Serving Cell ID 420 | | $S_3$ | $S_{11}$ | ... | $S_{(N-3)\times 8+3}$ |
| | | | $S_4$ | $S_{12}$ | | $S_{(N-3)\times 8+4}$ |
| | | | $S_5$ | $S_{13}$ | | $S_{(N-3)\times 8+5}$ |
| | | | $S_6$ | $S_{14}$ | | $S_{(N-3)\times 8+6}$ |
| R | R | | $S_7$ | $S_{15}$ | | $S_{(N-3)\times 8+7}$ |

UPDATING PUCCH SPATIAL RELATION INFORMATION

CROSS REFERENCE TO RELATED APPLICATION(S)

This application is National Stage Application filed under 35 U.S.C. § 371 of PCT International Application Serial No. PCT/CN2020/133035, entitled "METHODS AND APPARATUS FOR UPDATING PUCCH SPATIAL RELATION INFORMATION" and filed Dec. 1, 2020, which claims the benefit of International Patent Application No. PCT/CN2020/072985, entitled "METHODS AND APPARATUS FOR UPDATING PUCCH SPATIAL RELATION INFORMATION" and filed on Jan. 19, 2020, which are expressly incorporated by reference herein in their entirety.

BACKGROUND

Technical Field

The present disclosure relates generally to communication systems, and more particularly, to spatial relation information in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus may receive a medium access control (MAC) control element (CE) (MAC CE) indicating an update to a spatial relation configuration of the UE for physical uplink control channel (PUCCH) transmissions. In some aspects, the update can be indicated by PUCCH resource information, where the PUCCH resource information may include first PUCCH resource information including a first PUCCH resource identifier (ID) that identifies a first PUCCH resource and first spatial identification information. Also, the apparatus may update the spatial relation configuration of the UE based on at least one of the first PUCCH resource information or other PUCCH resource information of the PUCCH resource information. In some aspects, the other PUCCH resource information can be in a same PUCCH resource group as the first PUCCH resource. Moreover, the apparatus can transmit a PUCCH transmission based on the updated spatial relation configuration.

In an aspect of the disclosure, a method, a computer-readable medium, and an apparatus are provided. The apparatus may be a base station. In some aspects, the apparatus may generate a MAC CE indicating an update to a spatial relation configuration of a UE for PUCCH transmissions. The apparatus may also transmit a MAC CE indicating an update to a spatial relation configuration of a UE for PUCCH transmissions. In some instances, the update can be indicated by PUCCH resource information, where the PUCCH resource information may include first PUCCH resource information including a first PUCCH resource identifier (ID) that identifies a first PUCCH resource and first spatial identification information. Additionally, the apparatus may receive a PUCCH transmission based on an updated spatial relation configuration of the UE. In some instances, the updated spatial relation configuration may be based on at least one of the first PUCCH resource information or other PUCCH resource information of the PUCCH resource information, where the other PUCCH resource information may be in a same PUCCH resource group as the first PUCCH resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example structure of a MAC CE in accordance with one or more techniques of the present disclosure.

DETAILED DESCRIPTION

Figure 1:
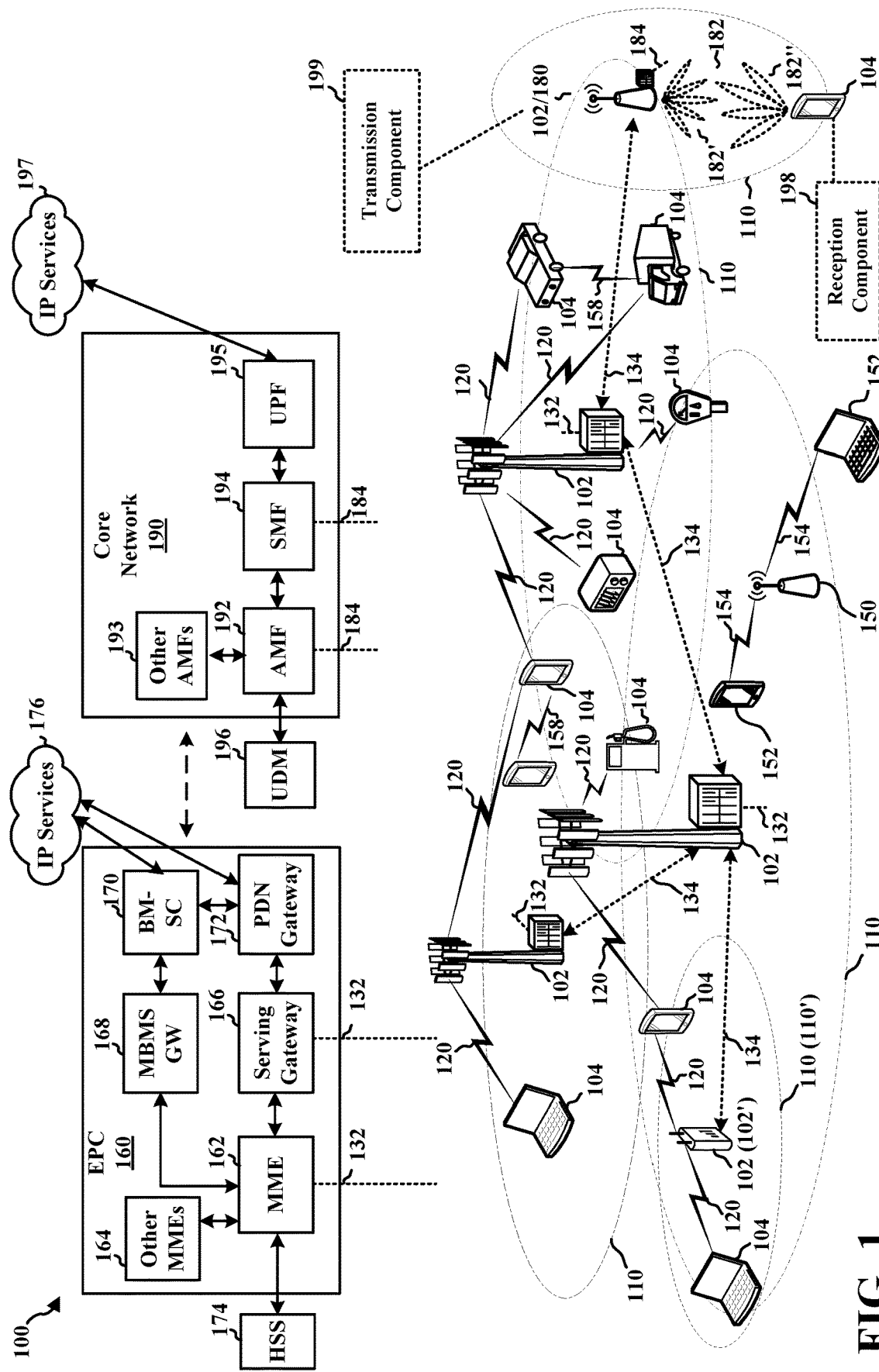
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive a medium access control (MAC) control element (CE) (MAC CE) indicating an update to a spatial relation configuration of the UE for physical uplink control channel (PUCCH) transmissions. In some aspects, the update can be indicated by PUCCH resource information, where the PUCCH resource information may include first PUCCH resource information including a first PUCCH resource identifier (ID) that identifies a first PUCCH resource and first spatial identification information. Reception component 198 may also be configured to update the spatial relation configuration of the UE based on at least one of the first PUCCH resource information or other PUCCH resource information of the PUCCH resource information. In some aspects, the other PUCCH resource information can be in a same PUCCH resource group as the first PUCCH resource. Reception component 198 may also be configured to transmit a PUCCH transmission based on the updated spatial relation configuration.

Referring again to FIG. 1, in certain aspects, the base station 180 may include a transmission component 199 configured to generate a MAC CE indicating an update to a spatial relation configuration of a UE for PUCCH transmissions. Transmission component 199 may also be configured to transmit a MAC CE indicating an update to a spatial relation configuration of a UE for PUCCH transmissions. In some instances, the update can be indicated by PUCCH resource information, where the PUCCH resource information may include first PUCCH resource information including a first PUCCH resource identifier (ID) that identifies a first PUCCH resource and first spatial identification information. Transmission component 199 may also be configured to receive a PUCCH transmission based on an updated spatial relation configuration of the UE. In some instances, the updated spatial relation configuration may be based on at least one of the first PUCCH resource information or other PUCCH resource information of the PUCCH resource information, where the other PUCCH resource information may be in a same PUCCH resource group as the first PUCCH resource.

Although the following description may be focused on 5G NR, the concepts described herein may be applicable to other similar areas, such as LTE, LTE-A, CDMA, GSM, and other wireless technologies.

Figure 2:
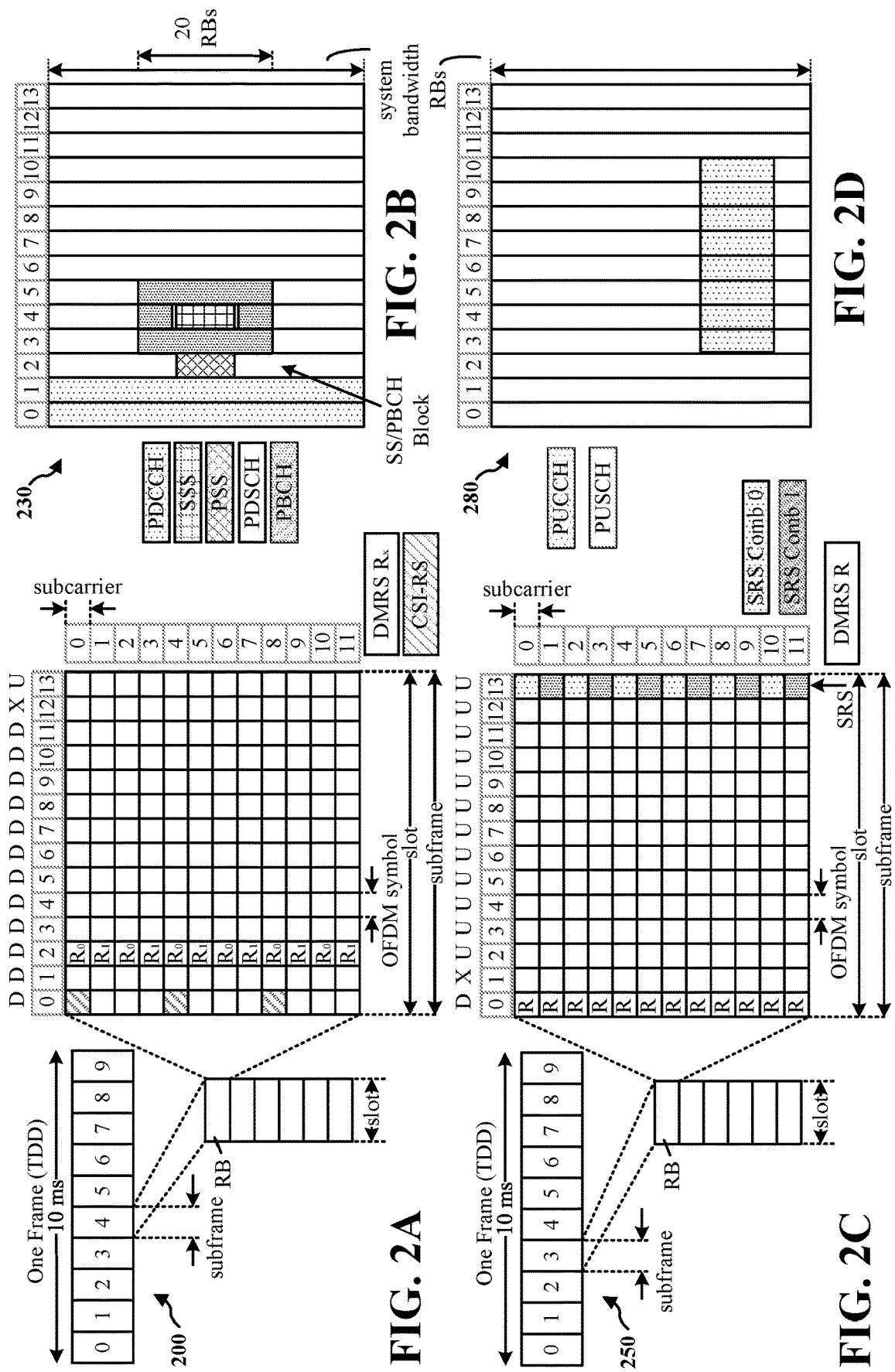
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
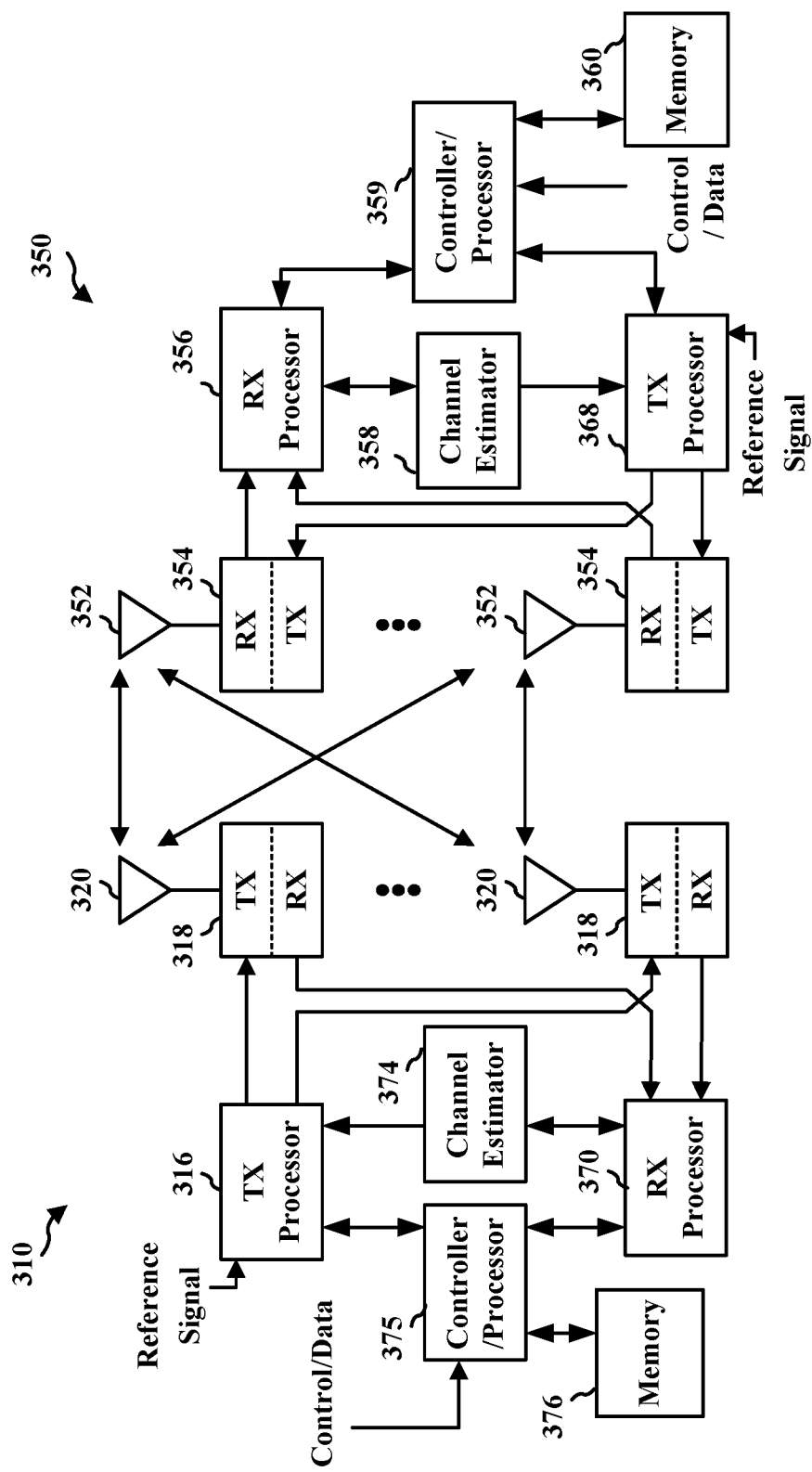
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of PUCCH transmissions may be transmitted according to a spatial relation configuration. In some instances, a spatial relation configuration can include one or more spatial settings, power control parameters, and/or a codebook. A spatial setting may include one or more reference signals that can define a transmission beam, e.g., used by a UE for PUCCH transmissions. Further, power control parameters may include a power output and/or path loss reference signals. Additionally, a base station may configure or preconfigure a UE with a spatial relation configuration via radio resource control (RRC) signaling. The UE may transmit a PUCCH transmission using a spatial domain filter based at least in part on the spatial relation configuration. Moreover, the base station may send a MAC CE including information to update the spatial relation configuration of the UE. Also, the UE may use information in the MAC CE to activate a spatial relation setting or deactivate a spatial relation setting in the spatial relation configuration.

As indicated above, a PUCCH spatial relation can be activated or deactivated based on a MAC CE. Also, the MAC CE can include a structure with a variety of fields including a serving cell ID, a bandwidth part (BWP) ID, a PUCCH resource ID, an 'S' field, and/or an 'R' field. The serving cell ID field can indicate the identity of the serving cell for which the MAC CE applies. In some aspects, the length of the serving cell ID field can be a number of bits, e.g., five bits. The BWP ID field can indicate an uplink BWP for which the MAC CE applies as the codepoint of the DCI bandwidth part indicator field. The length of the BWP ID field can be two bits.

The PUCCH resource ID field can contain an identifier of the PUCCH resource ID, e.g., identified by PUCCH-ResourceId. The length of the PUCCH resource ID field can be seven bits. In some aspects, if there is PUCCH spatial relation information, e.g., indicated by PUCCH-SpatialRelationInfoId, that is configured for the uplink bandwidth part indicated by the BWP ID field, then the $S_i$ field can indicate the activation status of PUCCH spatial relation information with PUCCH-SpatialRelationInfoId equal to i+1. Otherwise the MAC entity may ignore this field. The $S_i$ field can be set to '1' to indicate that PUCCH spatial relation information with PUCCH-SpatialRelationInfoId equal to i+1 can be activated. Also, the $S_i$ field can be set to '0' to indicate that PUCCH spatial relation information with PUCCH-SpatialRelationInfoId equal to i+1 can be deactivated. In some aspects, a single PUCCH spatial relation information can be active for a PUCCH resource at a time. Additionally, the 'R' field can be a reserved bit, e.g., set to '0'.

FIG. 4 displays an example structure of MAC CE 400. As shown in FIG. 4, the structure of MAC CE 400 includes a serving cell ID 420 field, a BWP ID 430 field, a PUCCH resource ID 440 field, multiple 'S' fields, and multiple 'R' fields. MAC CE 400 can be used to update a spatial relation configuration of a UE for PUCCH transmissions. MAC CE 400 includes a structure that is organized into multiple octets (Oct) of bits, i.e., eight bits, such as Oct 401, Oct 402, Oct, 403, Oct 404, and Oct N. The serving cell ID may be five bits and may identify a serving cell for which MAC CE 400 applies. Also, the BWP ID may be two bits and may indicate an uplink BWP for which MAC CE 400 applies. The PUCCH resource ID may be seven bits and may identify a PUCCH resource out of 128 possible PUCCH resources. 'R' fields may be reserve bits set to '0'. MAC CE 400 also includes an array of bits, designated as $S_0$ to $S_{(N-3)*8+7}$, to identity a spatial relation setting. Accordingly, there can be a number of different candidate spatial relation settings. For example, if N is 10, there may be 64 candidate spatial relation settings, which are designated as $S_0$ to $S_{63}$. In some aspects, an $S_i$ bit set to a value of '1' may activate the spatial relation setting. Also, an $S_i$ bit set to a value of '0' can deactivate the spatial relation setting.

In some aspects of wireless communications, the maximum number of spatial relations for a PUCCH, e.g., configured via an RRC, may be increased, e.g., increased from 8 to 64. Also, simultaneous updates or indications of a single spatial relation per group of a PUCCH can be accomplished by using one MAC CE that is supported with up to four groups per BWP. In some aspects, a MAC CE may be enhanced to account for an increase in candidate spatial relation settings. For instance, if a UE does not receive a MAC CE that effectively activates or deactivates a spatial relation setting, the UE may not utilize the most efficient spatial relation setting, which may lead to retransmissions. By doing so, the UE and a base station may utilize a high amount of power, which would not occur with a more efficient PUCCH transmission spatial relation setting. Further, a base station may have to send multiple MAC CEs to address multiple PUCCH resources. The base station and the UE may expend further power handling these multiple MAC CEs. Accordingly, it may be beneficial to enhance PUCCH spatial relation information in a MAC CE.

In some instances of wireless communications, there can be a number of PUCCH resources for configuring a UE, e.g., in a BWP. For instance, a PUCCH-ResourceId can identify which PUCCH resource may be utilized. As indicated above, a MAC CE can include the spatial relation information for the PUCCH resource. A UE can use the spatial relation information to transmit the PUCCH, e.g., with a specific angle or beam.

In some aspects, the spatial relation information can be updated based on a PUCCH resource group. For instance, some aspects of wireless communication can include a primary PUCCH group including a number of cells, e.g., a primary cell (PCell) or one or more secondary cells (SCells). A PCell and an SCell can have a number of PUCCH resources or PUCCH resource IDs. Also, a secondary PUCCH group can include one or more SCells. In some aspects, a PUCCH resource ID can configure a number of resources within a PCell or SCell. Additionally, a base station can be configured with PUCCH resource IDs that are included in a particular PCell or SCell.

In some instances, an update or indication of a single spatial relation per group of a PUCCH, e.g., by using a MAC CE, can include a number of configuration options for the group. For instance, there can be up to four groups per BWP. Also, the groups can be configured to utilize an implicit method or explicit method. For example, the configurations can correspond to different transmit-receive points (TRPs) or panels, e.g., including multiple TRPs or panels. Further, each configuration can correspond to different active spatial relations for a single TRP. In the instance of simultaneous updates or indications of a single spatial relation per group of PUCCH resources, e.g., by using a MAC CE, up to four PUCCH resource groups per BWP can be supported.

Aspects of the present disclosure can include a MAC CE that can update PUCCH spatial relation information. For instance, there may be group-based PUCCH spatial relation information updates. Some aspects of the present disclosure can explicitly configure a PUCCH resource group identifier, e.g., via RRC signaling. RRC signaling can also explicitly configure a certain amount of PUCCH groups per BWP, e.g., up to four PUCCH groups per BWP. Also, one PUCCH group may contain several PUCCH source identifiers. In some instances, an explicit PUCCH group identifier can be indicated in the MAC CE. Additionally, the PUCCH resource contained in the indicated PUCCH group may be updated with the spatial relation information.

Figure 5:
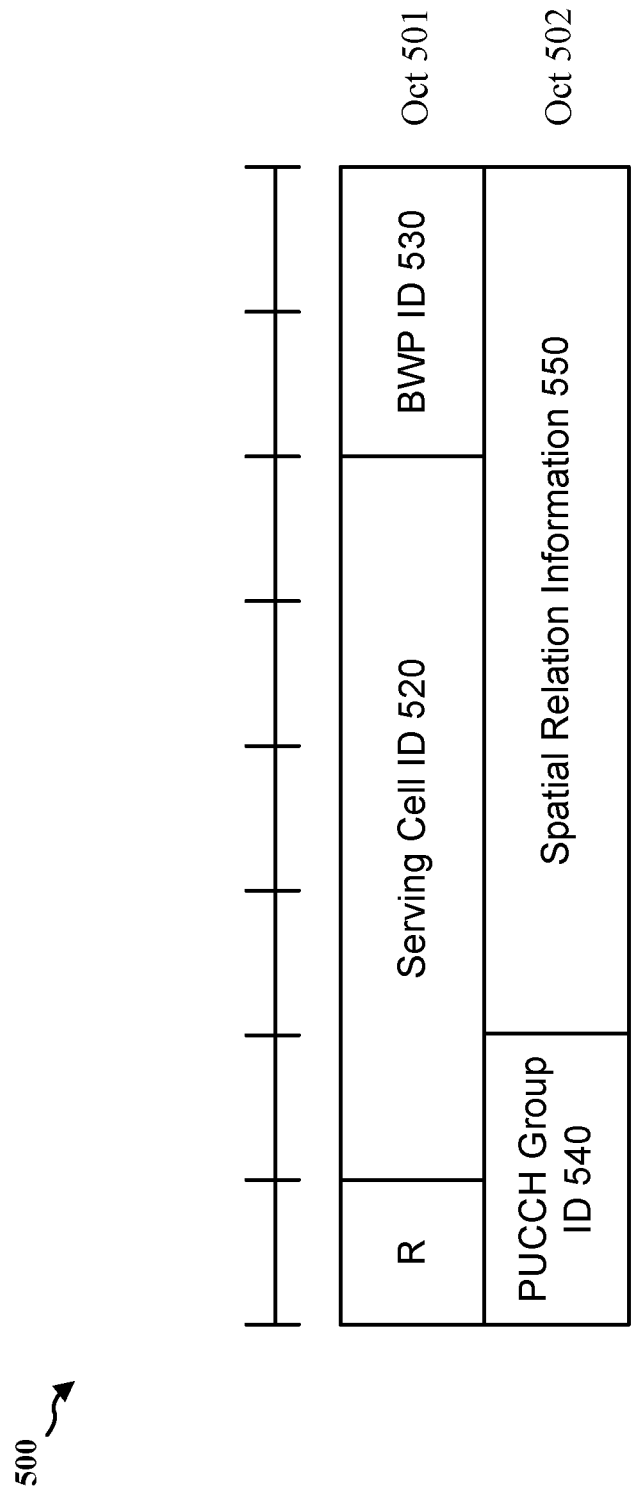
FIG. 5 is an example structure of a MAC CE in accordance with one or more techniques of the present disclosure.

FIG. 5 displays a structure of MAC CE 500 in accordance with the present disclosure. As shown in FIG. 5, serving cell ID 520, BWP ID 530, and reserve bit 'R' are on a single octet, e.g., octet 501. FIG. 5 also displays that spatial relation information 550 and a PUCCH group ID 540 are on a single octet, e.g., octet 502. More specifically, the spatial relation information 550 may occupy six bits, e.g., out of 64 spatial relation configurations, and PUCCH group ID 540 may occupy two bits, e.g., including four possible PUCCH groups, in a single octet. The spatial relation information can also be updated for the PUCCH resources in the PUCCH group ID.

In some instances, a UE can be preconfigured to determine which PUCCH resources correspond to a PUCCH group ID. Also, aspects of the present disclosure can implicitly configure the PUCCH resource group. For instance, the RRC signaling may not explicitly configure the PUCCH groups, but may introduce the PUCCH group identifier under each PUCCH resource. In some aspects, each PUCCH resource can be configured with one PUCCH group identifier. Also, in other aspects, each PUCCH resource may not be configured with any PUCCH group identifier. So the PUCCH group ID may be in each PUCCH resource. As such, there may not be dedicated signaling in the RRC for the PUCCH group.

In some aspects, a MAC CE may indicate several PUCCH resources and the corresponding updated spatial relation information. Once the UE receives the MAC CE, for each indicated PUCCH resource in the MAC CE, the other PUCCH resources that are implicitly configured with the same PUCCH group identifier may also update the same spatial relation information. Additionally, an indication bit in the MAC CE can be indicated as ON, e.g., with a value of 1', or OFF, e.g., with a value of '0'. If the indication bit is ON, the other PUCCH resources which are implicitly configured with the same PUCCH group identifier can update the same spatial relation information. If the indication bit is OFF, the PUCCH resource indicated in the MAC CE may update the spatial relation information. In this case, the other PUCCH resources with the same PUCCH group identifier may not be updated with the spatial relation information. In another case, if the indication bit is OFF, the first PUCCH resource indicated in the MAC CE may update the spatial relation information when the first PUCCH resource information does not correspond to a PUCCH resource group.

In one example, PUCCH resource $ID_1$ may be indicated in the MAC CE and PUCCH resource $ID_1$, PUCCH resource $ID_2$, PUCCH resource $ID_3$, and PUCCH resource $ID_4$ may be in the same group. If 'C' is ON, e.g., C=1, then PUCCH resource $ID_1$, PUCCH resource $ID_2$, PUCCH resource $ID_3$, and PUCCH resource $ID_4$ may be updated with the same spatial relation information. If 'C' is OFF, e.g., C=0, then PUCCH resource $ID_1$ can update the spatial relation information.

Aspects of the present disclosure can also utilize an explicit spatial relation information ID. For instance, the MAC CE can support a single entry to update one PUCCH resource with the updated spatial relation information. The MAC CE can also support multiple entries to update multiple PUCCH resources, e.g., up to 128 PUCCH resources, with corresponding spatial relation information. An indication bit, e.g., a 'C' bit, can indicate whether other PUCCH resources within the same PUCCH group may also be updated with the same spatial relation information.

Figures 6A, 6B:
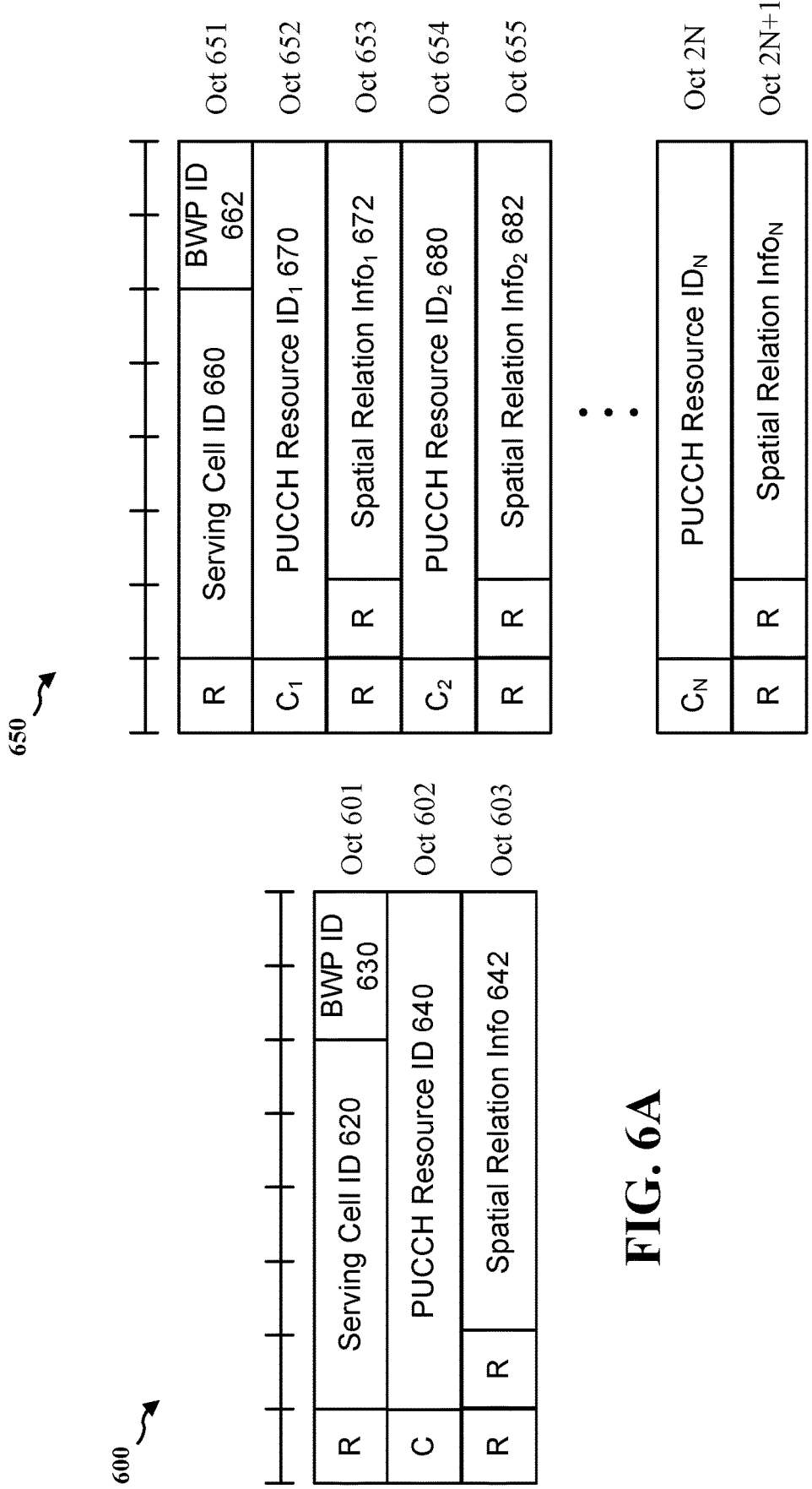
FIGS. 6A and 6B are example structures of a MAC CE in accordance with one or more techniques of the present disclosure.

FIGS. 6A and 6B display a structure of MAC CE 600 and structure of a MAC CE 650, respectively. FIG. 6A shows that in MAC CE 600 the reserve bit 'R' field may be one bit, the serving cell ID 620 field may be five bits, and the BWP ID 630 field may be two bits, e.g., in octet 601. FIG. 6A also shows that PUCCH resource ID 640 field may be a number of bits, e.g., seven bits, and indication bit 'C' may be one bit, e.g., in octet 602. Also, the spatial relation information 642 field may be six bits and reserve bit 'R' field may be two bits, e.g., in octet 603. Each of these fields may be a number of other bit sizes. As shown in FIG. 6A, one PUCCH resource ID can be utilized to update the spatial relation information.

FIG. 6B shows MAC CE 650 includes spatial relation information for multiple PUCCH resources for updating a spatial relation configuration. FIG. 6B shows that the reserve bit 'R' field may be one bit, the serving cell ID 660 field may be five bits, and the BWP ID 662 field may be two bits, e.g., in octet 651. Also, PUCCH resource ID 670 and 680 fields may be seven bits and indication bit 'C' may be one bit, e.g., in octets 652 and 654. The spatial relation information 672 and 682 fields may be six bits and reserve bit 'R' field may be two bits, e.g., in octets 653 and 655. Additionally, first PUCCH resource ID1 may correspond to first spatial relation information1, and second PUCCH resource ID2 may correspond to second spatial relation information2. There can also be indication bits, e.g., bit 'C', corresponding to each PUCCH resource. As shown in FIG. 6B, the PUCCH resource IDs can include up to PUCCH resource IDN, e.g., in octet 2N, and the spatial relation information can include up to spatial relation information N (Spatial Relation InfoN), e.g., in octet 2N+1. As shown in FIG. 6B, multiple PUCCH resource IDs can be utilized to update the spatial relation information.

In some instances, the PUCCH resource can include the PUCCH resource ID, as well as the starting physical resource block (PRB), the intraslot frequency hopping information, and/or a second hop PRB. Additionally, the PUCCH resource can include a number of different parameters, e.g., time or power parameters. As indicated above, a PUCCH group identifier or PUCCH resource information can be included, or not included, in the PUCCH resource group. As such, in some aspects, PUCCH resource information may be included in a PUCCH resource group. In other aspects, the PUCCH resource information may not be included in a PUCCH resource group. Moreover, a PUCCH configuration can be used to configure a number of UE specific PUCCH parameters. Accordingly, the base station can preconfigure the UE to transmit the PUCCH resource configuration including the PUCCH group ID. After this, the base station can configure the spatial relation information in the MAC CE.

In some aspects, a certain PUCCH resource ID can be part of multiple groups. As such, multiple PUCCH groups may be updated. Also, there may be a single PUCCH resource ID in a PUCCH group. In PUCCH groups with a single PUCCH resource ID, the PUCCH resource ID may be updated no matter the value of the indication bit 'C'. Additionally, one MAC CE can be utilized to update the spatial relation information for a single PUCCH resource or a group of PUCCH resources. In some instances, the MAC CE may include at least one of a first PUCCH resource information or a plurality of PUCCH resource information, where the spatial relation configuration of the UE may be updated for at least one of: a first PUCCH resource information, a plurality of PUCCH resource information, or other PUCCH resource information associated with a same PUCCH group as the first PUCCH resource information. Also, the same PUCCH group may include the first PUCCH resource information and the other PUCCH resource information, and where no other PUCCH resources in the same PUCCH group may be indicated in the MAC CE.

Aspects of the present disclosure can also utilize spatial relation information based on a bitmap. For instance, a bitmap can indicate the selection status of the spatial relation information. For example, if $S_i$ in a bitmap is set to a value of '1', the spatial relation information $S_i$ may be configured for the indicated PUCCH resource. Also, the indication bit 'C' can indicate whether other PUCCH resources within the same PUCCH group should also be updated with the same spatial relation information.

Figure 7:
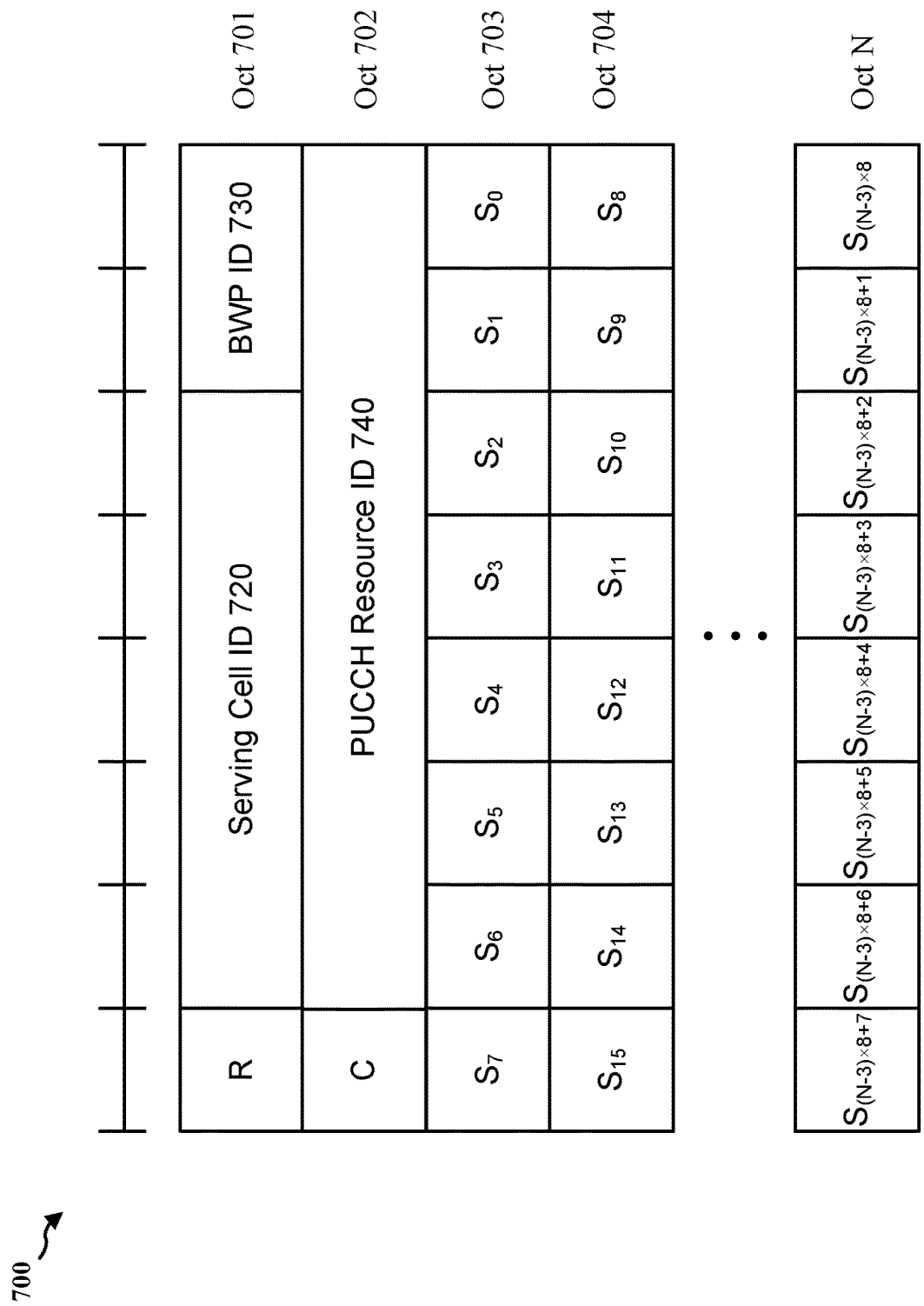
FIG. 7 is an example structure of a MAC CE in accordance with one or more techniques of the present disclosure.

FIG. 7 displays a structure of MAC CE 700. More specifically, FIG. 7 shows MAC CE 700 including a bitmap for multiple PUCCH resources for updating a spatial relation configuration of a UE. FIG. 7 shows that the reserve bit 'R' field may be one bit, the serving cell ID 720 field may be five bits, and the BWP ID 730 field may be two bits, e.g., in octet 701. Also, PUCCH resource ID 740 field may be seven bits and indication bit 'C' may be one bit, e.g., in octet 702. The spatial relation information may be in the form of a bitmap, e.g., up to 64 bits, corresponding to the spatial relation information ID. A base station may utilize a single bit in the bitmap to indicate the spatial relation information. For example, the network or base station can indicate a single bit to update the spatial relation information out of 64 bits in the bitmap, e.g., $S_0$ to $S_{63}$, to identify the spatial relation information.

As shown in FIG. 7, the bitmap of spatial relation information may include a number of bits, e.g., $S_i$, in a number of different octets, e.g., octet 703, octet 704, through octet N. For example, $S_i$ with a value of '1' may indicate that spatial relation information is present. $S_i$ with a value of '0' may indicate that spatial relation information is not present. Additionally, the indication bit 'C' can indicate whether other PUCCH resources within the same PUCCH group should be updated with the same spatial relation information.

Figure 8:
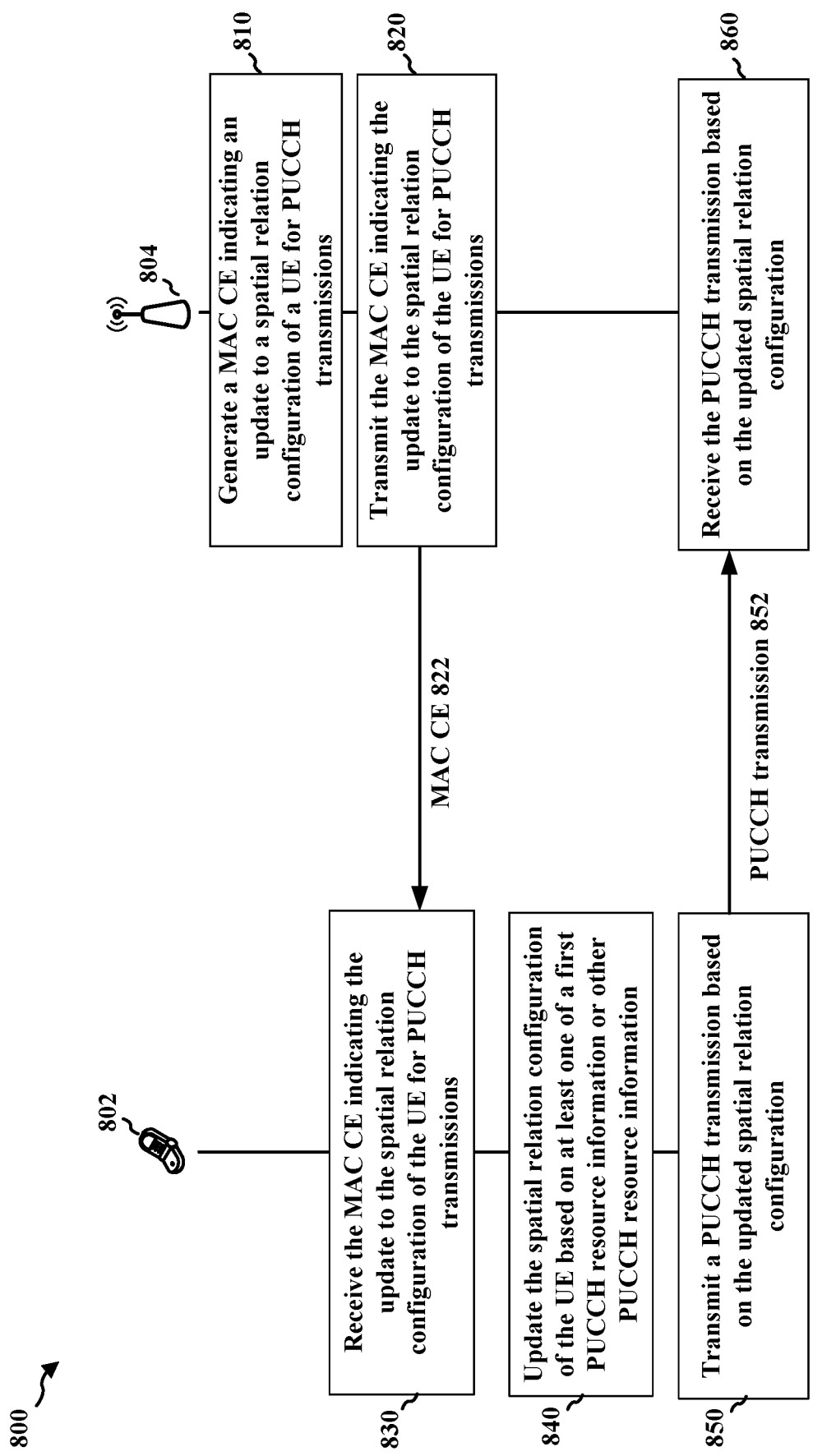
FIG. 8 is a diagram illustrating example communication between a UE and a base station in accordance with one or more techniques of the present disclosure.

FIG. 8 is a diagram 800 illustrating example communication between a UE 802 and a base station 804. At 810, the base station 804 may generate a MAC CE, e.g., MAC CE 822, indicating an update to a spatial relation configuration of a UE for PUCCH transmissions. At 820, the base station 804 may transmit the MAC CE, e.g., MAC CE 822, indicating the update to the spatial relation configuration of the UE for PUCCH transmissions. In some instances, the update can be indicated by PUCCH resource information, where the PUCCH resource information may include first PUCCH resource information including a first PUCCH resource ID that identifies a first PUCCH resource and first spatial identification information.

At 830, the UE 802 may receive the MAC CE, e.g., MAC CE 822, indicating the update to the spatial relation configuration of the UE for PUCCH transmissions. At 840, the UE 802 may update the spatial relation configuration of the UE based on at least one of the first PUCCH resource information or other PUCCH resource information of the PUCCH resource information. In some aspects, the other PUCCH resource information can be in a same PUCCH resource group as the first PUCCH resource.

At 850, the UE 802 may transmit a PUCCH transmission, e.g., PUCCH transmission 852, based on the updated spatial relation configuration. At 860, the base station 804 may receive a PUCCH transmission, e.g., PUCCH transmission 852, based on the updated spatial relation configuration. In some instances, the updated spatial relation configuration may be based on at least one of the first PUCCH resource information or other PUCCH resource information of the PUCCH resource information, where the other PUCCH resource information may be in a same PUCCH resource group as the first PUCCH resource.

In some aspects, the first spatial identification information can include a first spatial relation ID that identifies a first spatial relation configuration, where the first spatial relation configuration may include at least one of spatial settings or power control parameters on the first PUCCH resource. Also, the PUCCH resource information can include a plurality of PUCCH resource IDs, where each of the plurality of PUCCH resource IDs may include respective spatial identification information. In some instances, the PUCCH resource information may be included in a PUCCH resource group, or where the PUCCH resource information may not be included in a PUCCH resource group. Additionally, the spatial relation configuration of the UE can be updated based on the first PUCCH resource information and the first spatial identification information.

Also, an indication bit in the MAC CE can indicate whether the spatial relation configuration of the UE is updated based on at least one of the first PUCCH resource information or the other PUCCH resource information. In some aspects, a first value of the indication bit may indicate that the spatial relation configuration of the UE is updated based on the first PUCCH resource information, and a second value of the indication bit may indicate that the spatial relation configuration of the UE is updated based on the other PUCCH resource information. Further, the second value of the indication bit may indicate that the spatial relation configuration of the UE is updated based on the first PUCCH resource information when the first PUCCH resource information does not correspond to a PUCCH resource group.

Moreover, the MAC CE may include at least one of the first PUCCH resource information or a plurality of PUCCH resource information, where the spatial relation configuration of the UE may be updated for at least one of the first PUCCH resource information, the plurality of PUCCH resource information, or other PUCCH resource information associated with a same PUCCH group as the first PUCCH resource information. In some instances, the same PUCCH group may include the first PUCCH resource information and the other PUCCH resource information, and where no other PUCCH resources in the same PUCCH group may be indicated in the MAC CE. Additionally, the first spatial identification information may include a bitmap of configurations of spatial settings and power control parameters for transmission on the first PUCCH resource, where the bitmap can identify the spatial relation configuration on the first PUCCH resource.

Figure 9:
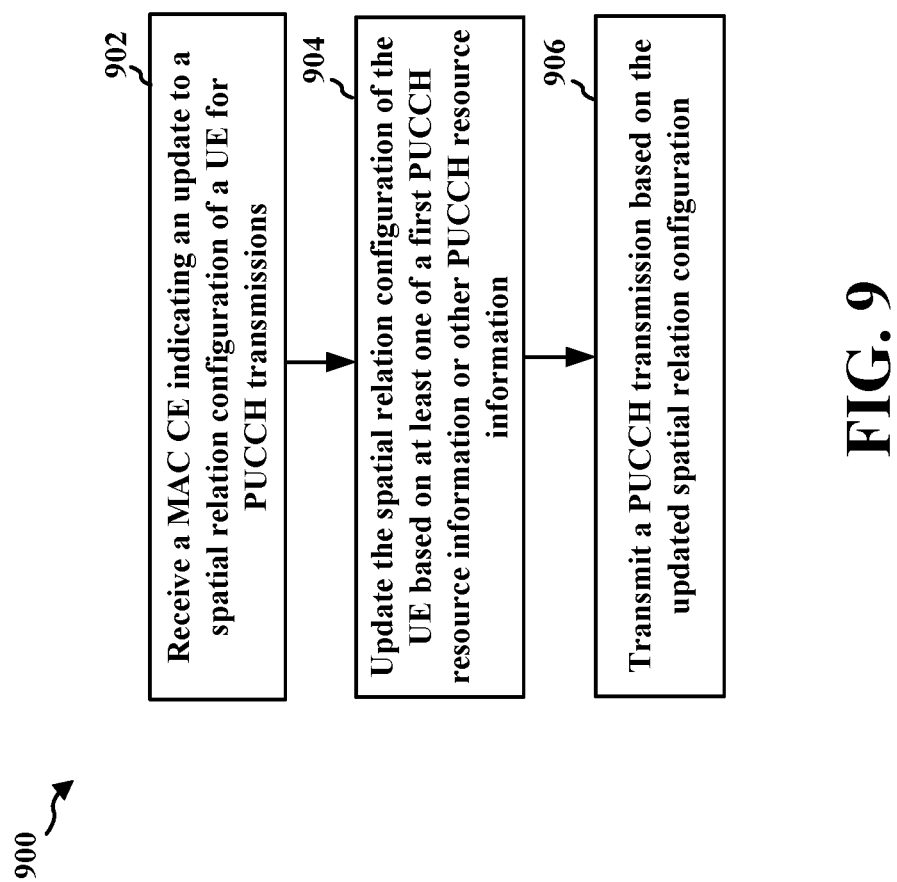
FIG. 9 is a flowchart of a method of wireless communication in accordance with one or more techniques of the present disclosure.

FIG. 9 is a flowchart 900 of a method of wireless communication. The method may be performed by a UE or a component of a UE (e.g., the UE 104, 350, 802; the apparatus 1102; a processing system, which may include the memory 360 and which may be the entire UE or a component of the UE, such as the TX processor 368, the RX processor 356, and/or the controller/processor 359). Optional aspects are illustrated with a dashed line. The methods described herein can provide a number of benefits, such as improving communication signaling, resource utilization, and/or power savings.

At 902, the UE may receive a MAC CE indicating an update to a spatial relation configuration of the UE for PUCCH transmissions, as described in connection with the examples in FIGS. 4-8. For example, 902 may be performed by 1140 in FIG. 11. In some aspects, the update can be indicated by PUCCH resource information, where the PUCCH resource information may include first PUCCH resource information including a first PUCCH resource identifier (ID) that identifies a first PUCCH resource and first spatial identification information, as described in connection with the examples in FIGS. 4-8.

At 904, the UE may update the spatial relation configuration of the UE based on at least one of the first PUCCH resource information or other PUCCH resource information of the PUCCH resource information, as described in connection with the examples in FIGS. 4-8. For example, 904 may be performed by 1140 in FIG. 11. In some aspects, the other PUCCH resource information can be in a same PUCCH resource group as the first PUCCH resource, as described in connection with the examples in FIGS. 4-8.

At 906, the UE may transmit a PUCCH transmission based on the updated spatial relation configuration, as described in connection with the examples in FIGS. 4-8. For example, 906 may be performed by 1140 in FIG. 11.

In some aspects, the first spatial identification information can include a first spatial relation ID that identifies a first spatial relation configuration, where the first spatial relation configuration may include at least one of spatial settings or power control parameters on the first PUCCH resource, as described in connection with the examples in FIGS. 4-8. Additionally, the PUCCH resource information can include a plurality of PUCCH resource IDs, where each of the plurality of PUCCH resource IDs may include respective spatial identification information, as described in connection with the examples in FIGS. 4-8. In some instances, the PUCCH resource information may be included in a PUCCH resource group, or where the PUCCH resource information may not be included in a PUCCH resource group, as described in connection with the examples in FIGS. 4-8. Also, the spatial relation configuration of the UE can be updated based on the first PUCCH resource information and the first spatial identification information, as described in connection with the examples in FIGS. 4-8.

Further, an indication bit in the MAC CE can indicate whether the spatial relation configuration of the UE is updated based on at least one of the first PUCCH resource information or the other PUCCH resource information, as described in connection with the examples in FIGS. 4-8. In some aspects, a first value of the indication bit may indicate that the spatial relation configuration of the UE is updated based on the first PUCCH resource information, and a second value of the indication bit may indicate that the spatial relation configuration of the UE is updated based on the other PUCCH resource information, as described in connection with the examples in FIGS. 4-8. Moreover, the second value of the indication bit may indicate that the spatial relation configuration of the UE is updated based on the first PUCCH resource information when the first PUCCH resource information does not correspond to a PUCCH resource group, as described in connection with the examples in FIGS. 4-8.

Also, the MAC CE may include at least one of the first PUCCH resource information or a plurality of PUCCH resource information, where the spatial relation configuration of the UE may be updated for at least one of the first PUCCH resource information, the plurality of PUCCH resource information, or other PUCCH resource information associated with a same PUCCH group as the first PUCCH resource information, as described in connection with the examples in FIGS. 4-8. In some instances, the same PUCCH group may include the first PUCCH resource information and the other PUCCH resource information, and where no other PUCCH resources in the same PUCCH group may be indicated in the MAC CE, as described in connection with the examples in FIGS. 4-8. In addition, the first spatial identification information may include a bitmap of configurations of spatial settings and power control parameters for transmission on the first PUCCH resource, where the bitmap can identify the spatial relation configuration on the first PUCCH resource, as described in connection with the examples in FIGS. 4-8.

Figure 10:
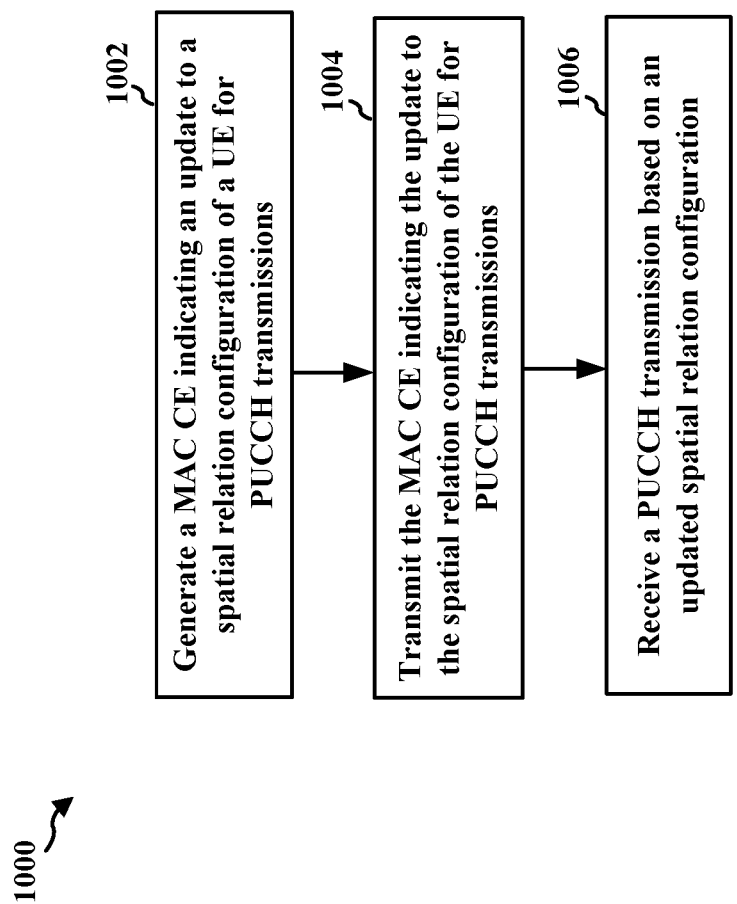
FIG. 10 is a flowchart of a method of wireless communication in accordance with one or more techniques of the present disclosure.

FIG. 10 is a flowchart 1000 of a method of wireless communication. The method may be performed by a base station or a component of a base station (e.g., the base station 102, 310, 804; the apparatus 1202; a processing system, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits, such as improving communication signaling, resource utilization, and/or power savings.

At 1002, the base station may generate a MAC CE indicating an update to a spatial relation configuration of a UE for PUCCH transmissions, as described in connection with the examples in FIGS. 4-8. For example, 1002 may be performed by 1240 in FIG. 12.

At 1004, the base station may transmit the MAC CE indicating an update to a spatial relation configuration of a UE for PUCCH transmissions, as described in connection with the examples in FIGS. 4-8. For example, 1004 may be performed by 1240 in FIG. 12. In some instances, the update can be indicated by PUCCH resource information, where the PUCCH resource information may include first PUCCH resource information including a first PUCCH resource ID that identifies a first PUCCH resource and first spatial identification information, as described in connection with the examples in FIGS. 4-8.

At 1006, the base station may receive a PUCCH transmission based on an updated spatial relation configuration of the UE, as described in connection with the examples in FIGS. 4-8. For example, 1006 may be performed by 1240 in FIG. 12. In some instances, the updated spatial relation configuration may be based on at least one of the first PUCCH resource information or other PUCCH resource information of the PUCCH resource information, where the other PUCCH resource information may be in a same PUCCH resource group as the first PUCCH resource, as described in connection with the examples in FIGS. 4-8.

In some aspects, the first spatial identification information can include a first spatial relation ID that identifies a first spatial relation configuration, where the first spatial relation configuration may include at least one of spatial settings or power control parameters on the first PUCCH resource, as described in connection with the examples in FIGS. 4-8. Also, the PUCCH resource information can include a plurality of PUCCH resource IDs, where each of the plurality of PUCCH resource IDs may include respective spatial identification information, as described in connection with the examples in FIGS. 4-8. In some instances, the PUCCH resource information may be included in a PUCCH resource group, or where the PUCCH resource information may not be included in a PUCCH resource group, as described in connection with the examples in FIGS. 4-8. Additionally, the spatial relation configuration of the UE can be updated based on the first PUCCH resource information and the first spatial identification information, as described in connection with the examples in FIGS. 4-8.

Moreover, an indication bit in the MAC CE can indicate whether the spatial relation configuration of the UE is updated based on at least one of the first PUCCH resource information or the other PUCCH resource information, as described in connection with the examples in FIGS. 4-8. In some aspects, a first value of the indication bit may indicate that the spatial relation configuration of the UE is updated based on the first PUCCH resource information, and a second value of the indication bit may indicate that the spatial relation configuration of the UE is updated based on the other PUCCH resource information, as described in connection with the examples in FIGS. 4-8. Further, the second value of the indication bit may indicate that the spatial relation configuration of the UE is updated based on the first PUCCH resource information when the first PUCCH resource information does not correspond to a PUCCH resource group, as described in connection with the examples in FIGS. 4-8.

Also, the MAC CE may include at least one of the first PUCCH resource information or a plurality of PUCCH resource information, where the spatial relation configuration of the UE may be updated for at least one of the first PUCCH resource information, the plurality of PUCCH resource information, or other PUCCH resource information associated with a same PUCCH group as the first PUCCH resource information, as described in connection with the examples in FIGS. 4-8. In some instances, the same PUCCH group may include the first PUCCH resource information and the other PUCCH resource information, and where no other PUCCH resources in the same PUCCH group may be indicated in the MAC CE, as described in connection with the examples in FIGS. 4-8. Additionally, the first spatial identification information may include a bitmap of configurations of spatial settings and power control parameters for transmission on the first PUCCH resource, where the bitmap can identify the spatial relation configuration on the first PUCCH resource, as described in connection with the examples in FIGS. 4-8.

Figure 11:
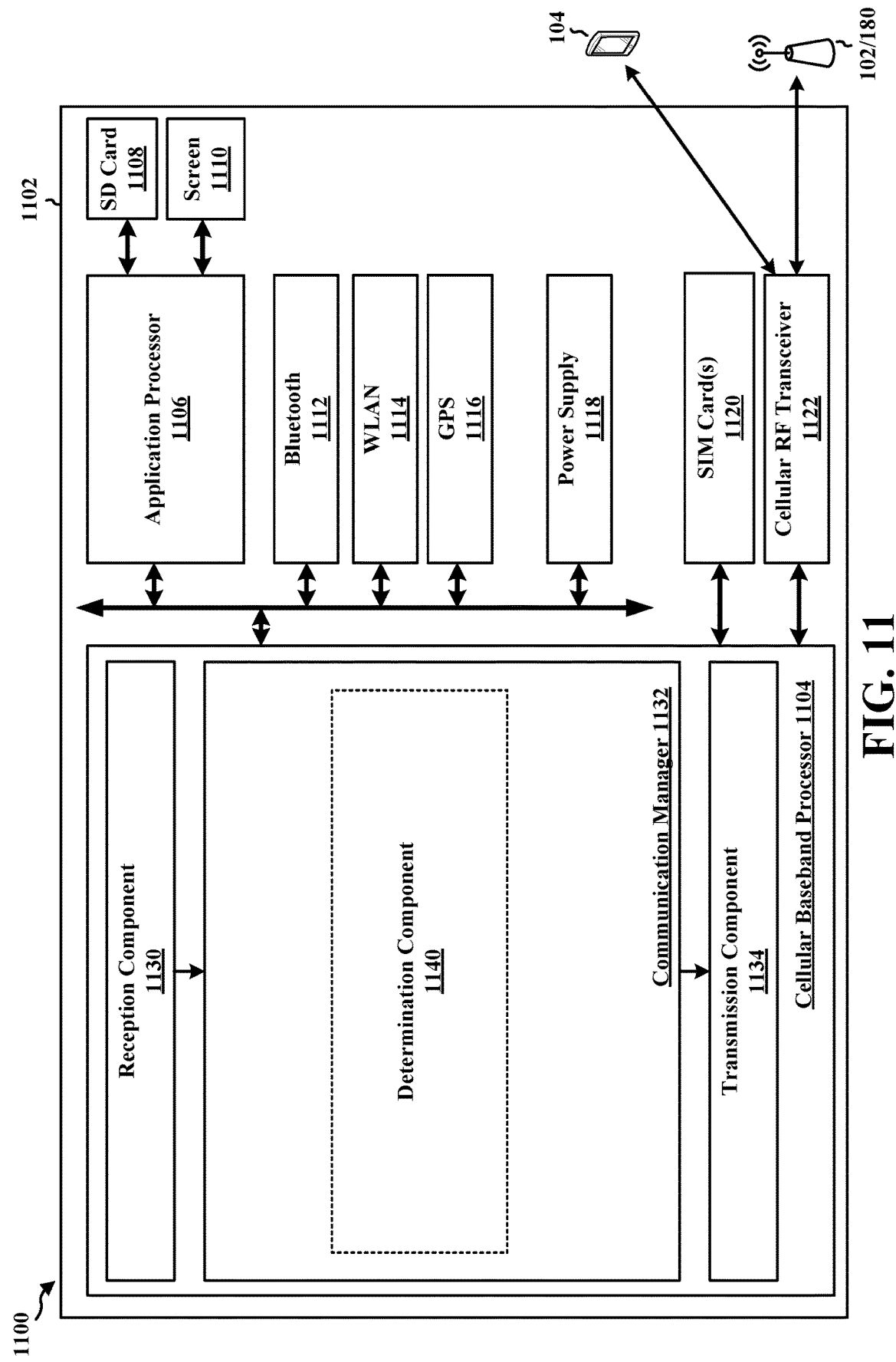
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a determination component 1140 that is configured to receive a medium access control (MAC) control element (CE) (MAC CE) indicating an update to a spatial relation configuration of the UE for physical uplink control channel (PUCCH) transmissions, e.g., as described in connection with 902 in FIG. 9. Determination component 1140 is also configured to update the spatial relation configuration of the UE based on at least one of the first PUCCH resource information or other PUCCH resource information of the PUCCH resource information, e.g., as described in connection with 904 in FIG. 9. Determination component 1140 is also configured to transmit a PUCCH transmission based on the updated spatial relation configuration, e.g., as described in connection with 906 in FIG. 9.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a medium access control (MAC) control element (CE) (MAC CE) indicating an update to a spatial relation configuration of the UE for physical uplink control channel (PUCCH) transmissions, the update indicated by PUCCH resource information, where the PUCCH resource information includes first PUCCH resource information including a first PUCCH resource identifier (ID) that identifies a first PUCCH resource and first spatial identification information; means for updating the spatial relation configuration of the UE based on at least one of the first PUCCH resource information or other PUCCH resource information of the PUCCH resource information, where the other PUCCH resource information is in a same PUCCH resource group as the first PUCCH resource; and means for transmitting a PUCCH transmission based on the updated spatial relation configuration. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
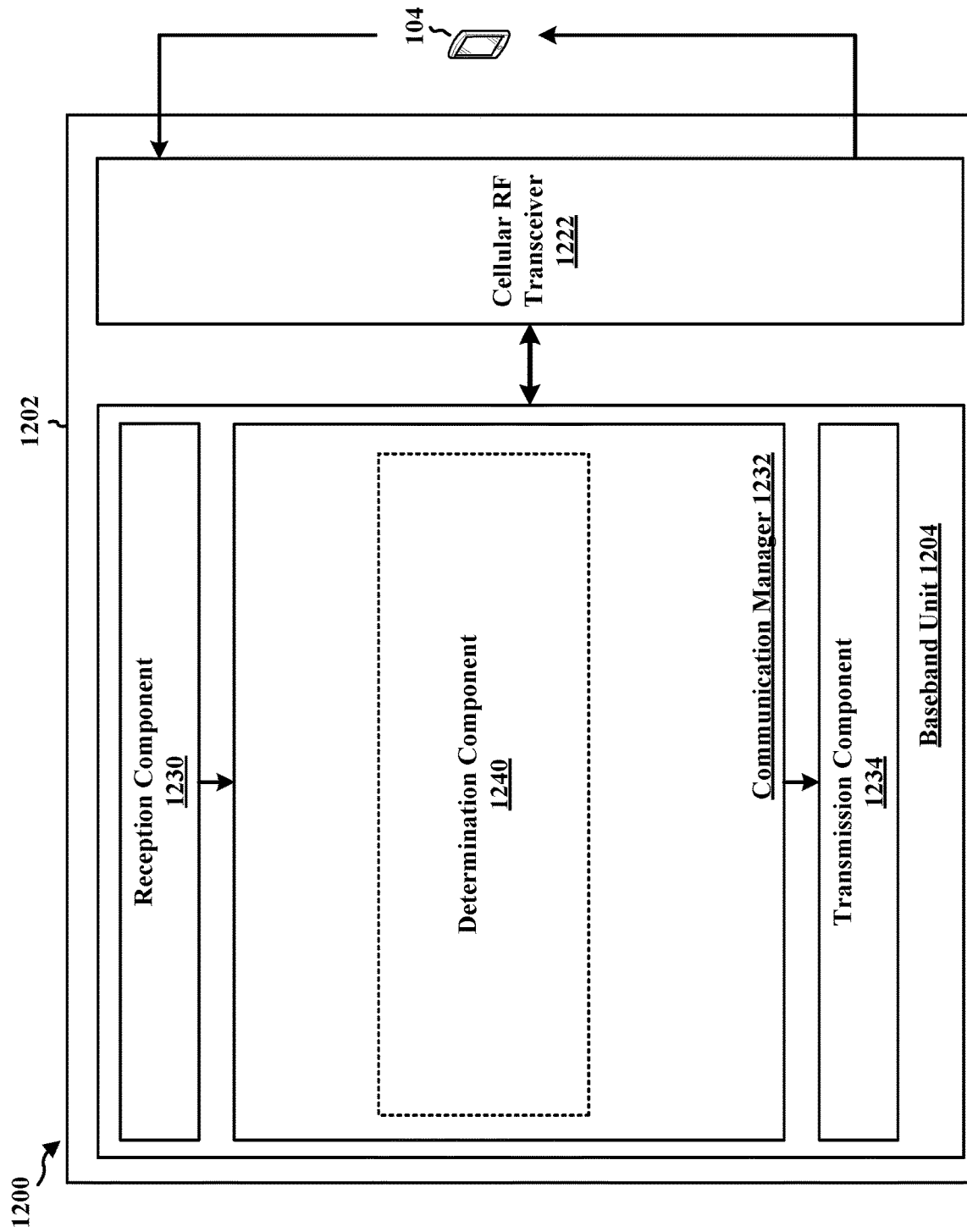
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a determination component 1240 that is configured to generate the MAC CE indicating the update to the spatial relation configuration of the UE for PUCCH transmissions, e.g., as described in connection with 1002 in FIG. 10. Determination component 1240 is also configured to transmit a medium access control (MAC) control element (CE) (MAC CE) indicating an update to a spatial relation configuration of a user equipment (UE) for physical uplink control channel (PUCCH) transmissions, the update indicated by PUCCH resource information, where the PUCCH resource information includes first PUCCH resource information including a first PUCCH resource identifier (ID) that identifies a first PUCCH resource and first spatial identification information, e.g., as described in connection with 1004 in FIG. 10. Determination component 1240 is also configured to receive a PUCCH transmission based on an updated spatial relation configuration of the UE, where the updated spatial relation configuration is based on at least one of the first PUCCH resource information or other PUCCH resource information of the PUCCH resource information, where the other PUCCH resource information is in a same PUCCH resource group as the first PUCCH resource, e.g., as described in connection with 1006 in FIG. 10.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for generating the MAC CE indicating the update to the spatial relation configuration of the UE for PUCCH transmissions; means for transmitting a medium access control (MAC) control element (CE) (MAC CE) indicating an update to a spatial relation configuration of a user equipment (UE) for physical uplink control channel (PUCCH) transmissions, the update indicated by PUCCH resource information, where the PUCCH resource information includes first PUCCH resource information including a first PUCCH resource identifier (ID) that identifies a first PUCCH resource and first spatial identification information; and means for receiving a PUCCH transmission based on an updated spatial relation configuration of the UE, where the updated spatial relation configuration is based on at least one of the first PUCCH resource information or other PUCCH resource information of the PUCCH resource information, where the other PUCCH resource information is in a same PUCCH resource group as the first PUCCH resource. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes receiving a medium access control (MAC) control element (CE) (MAC CE) indicating an update to a spatial relation configuration of the UE for physical uplink control channel (PUCCH) transmissions, the update indicated by PUCCH resource information, where the PUCCH resource information includes first PUCCH resource information including a first PUCCH resource identifier (ID) that identifies a first PUCCH resource and first spatial identification information; updating the spatial relation configuration of the UE based on at least one of the first PUCCH resource information or other PUCCH resource information of the PUCCH resource information, where the other PUCCH resource information is in a same PUCCH resource group as the first PUCCH resource; and transmitting a PUCCH transmission based on the updated spatial relation configuration.

Aspect 2 is the method of aspect 1, where the first spatial identification information includes a first spatial relation ID that identifies a first spatial relation configuration, the first spatial relation configuration including at least one of spatial settings or power control parameters on the first PUCCH resource.

Aspect 3 is the method of any of aspects 1 and 2, where the PUCCH resource information includes a plurality of PUCCH resource IDs, each of the plurality of PUCCH resource IDs including respective spatial identification information.

Aspect 4 is the method of any of aspects 1 to 3, where the PUCCH resource information is included in a PUCCH resource group, or where the PUCCH resource information is not included in a PUCCH resource group.

Aspect 5 is the method of any of aspects 1 to 4, where the spatial relation configuration of the UE is updated based on the first PUCCH resource information and the first spatial identification information.

Aspect 6 is the method of any of aspects 1 to 5, where an indication bit in the MAC CE indicates whether the spatial relation configuration of the UE is updated based on at least one of the first PUCCH resource information or the other PUCCH resource information.

Aspect 7 is the method of any of aspects 1 to 6, where a first value of the indication bit indicates that the spatial relation configuration of the UE is updated based on the first PUCCH resource information, and a second value of the indication bit indicates that the spatial relation configuration of the UE is updated based on the other PUCCH resource information; where the second value of the indication bit indicates that the spatial relation configuration of the UE is updated based on the first PUCCH resource information when the first PUCCH resource information does not correspond to a PUCCH resource group.

Aspect 8 is the method of any of aspects 1 to 7, where the MAC CE includes at least one of the first PUCCH resource information or a plurality of PUCCH resource information, where the spatial relation configuration of the UE is updated for at least one of the first PUCCH resource information, the plurality of PUCCH resource information, or other PUCCH resource information associated with a same PUCCH group as the first PUCCH resource information.

Aspect 9 is the method of any of aspects 1 to 8, where the same PUCCH group includes the first PUCCH resource information and the other PUCCH resource information, and where no other PUCCH resources in the same PUCCH group are indicated in the MAC CE.

Aspect 10 is the method of any of aspects 1 to 9, where the first spatial identification information includes a bitmap of configurations of spatial settings and power control parameters for transmission on the first PUCCH resource, the bitmap identifying the spatial relation configuration on the first PUCCH resource.

Aspect 11 is an apparatus for wireless communication including means for implementing a method as in any of aspects 1 to 10.

Aspect 12 is an apparatus for wireless communication including at least one processor coupled to a memory and configured to implement a method as in any of aspects 1 to 10.

Aspect 13 is a computer-readable medium storing computer executable code, where the code when executed by a processor causes the processor to implement a method as in any of aspects 1 to 10.

Aspect 14 is a method of wireless communication of a base station. The method includes transmitting a medium access control (MAC) control element (CE) (MAC CE) indicating an update to a spatial relation configuration of a user equipment (UE) for physical uplink control channel (PUCCH) transmissions, the update indicated by PUCCH resource information, where the PUCCH resource information includes first PUCCH resource information including a first PUCCH resource identifier (ID) that identifies a first PUCCH resource and first spatial identification information; and receiving a PUCCH transmission based on an updated spatial relation configuration of the UE, where the updated spatial relation configuration is based on at least one of the first PUCCH resource information or other PUCCH resource information of the PUCCH resource information, where the other PUCCH resource information is in a same PUCCH resource group as the first PUCCH resource.

Aspect 15 is the method of aspect 14, where the first spatial identification information includes a first spatial relation ID that identifies a first spatial relation configuration, the first spatial relation configuration including at least one of spatial settings or power control parameters on the first PUCCH resource.

Aspect 16 is the method of any of aspects 14 and 15, where the PUCCH resource information includes a plurality of PUCCH resource IDs, each of the plurality of PUCCH resource IDs including respective spatial identification information.

Aspect 17 is the method of any of aspects 14 to 16, where the PUCCH resource information is included in a PUCCH resource group, or where the PUCCH resource information is not included in a PUCCH resource group.

Aspect 18 is the method of any of aspects 14 to 17, where the updated spatial relation configuration is based on the first PUCCH resource information and the first spatial identification information.

Aspect 19 is the method of any of aspects 14 to 18, where an indication bit in the MAC CE indicates whether the updated spatial relation configuration is based on at least one of the first PUCCH resource information or the other PUCCH resource information.

Aspect 20 is the method of any of aspects 14 to 19, where a first value of the indication bit indicates that the updated spatial relation configuration is based on the first PUCCH resource information, and a second value of the indication bit indicates that the updated spatial relation configuration is based on the other PUCCH resource information; where the second value of the indication bit indicates that the spatial relation configuration of the UE is updated based on the first PUCCH resource information when the first PUCCH resource information does not correspond to a PUCCH resource group.

Aspect 21 is the method of any of aspects 14 to 20, where the MAC CE includes at least one of the first PUCCH resource information or a plurality of PUCCH resource information, where the spatial relation configuration of the UE is updated for at least one of the first PUCCH resource information, the plurality of PUCCH resource information, or other PUCCH resource information associated with a same PUCCH group as the first PUCCH resource information.

Aspect 22 is the method of any of aspects 14 to 21, where the same PUCCH group includes the first PUCCH resource information and the other PUCCH resource information, and where no other PUCCH resources in the same PUCCH group are indicated in the MAC CE.

Aspect 23 is the method of any of aspects 14 to 22, where the first spatial identification information includes a bitmap of configurations of spatial settings and power control parameters for transmission on the first PUCCH resource, the bitmap identifying the spatial relation configuration on the first PUCCH resource.

Aspect 24 is the method of any of aspects 14 to 23, further comprising generating the MAC CE indicating the update to the spatial relation configuration of the UE for PUCCH transmissions.

Aspect 25 is an apparatus for wireless communication including means for implementing a method as in any of aspects 14 to 24.

Aspect 26 is an apparatus for wireless communication including at least one processor coupled to a memory and configured to implement a method as in any of aspects 14 to 24.

Aspect 27 is a computer-readable medium storing computer executable code, where the code when executed by a processor causes the processor to implement a method as in any of aspects 14 to 24.

What is claimed is:

1. A method of wireless communication of a user equipment (UE), comprising:
    receiving a medium access control (MAC) control element (CE) (MAC CE) indicating an update to a spatial relation configuration of a plurality of physical uplink control channel (PUCCH) resources of the UE for PUCCH transmissions, wherein the MAC CE includes a first PUCCH resource identifier (ID) that identifies a first PUCCH resource and is associated with a first PUCCH resource group in the plurality of PUCCH resources, wherein the MAC CE includes first spatial relation information, and wherein the MAC CE comprises a first value of an indication bit that indicates the update to the spatial relation configuration for a set of other PUCCH resources in the first PUCCH resource group associated with the first PUCCH resource ID, and wherein the MAC CE does not comprise a PUCCH resource ID that identifies a PUCCH resource in the set of other PUCCH resources in the first PUCCH resource group;
    updating, based on the first PUCCH resource ID and the first spatial relation information, the spatial relation configuration of the plurality of PUCCH resources of the UE; and
    transmitting a PUCCH transmission based on the updated spatial relation configuration.

2. The method of claim 1, wherein the first spatial relation information identifies a first spatial relation configuration, wherein the first spatial relation configuration includes at least one of spatial settings or power control parameters.

3. The method of claim 1, wherein the MAC CE includes multiple PUCCH resource IDs and respective spatial relation information, wherein updating the spatial relation configuration of the plurality of PUCCH resources of the UE is further based on the multiple PUCCH resource IDs and the respective spatial relation information.

4. The method of claim 3, wherein each of the multiple PUCCH resource IDs is associated with up to one respective PUCCH resource group and the plurality of PUCCH resources comprises PUCCH resources associated with any PUCCH resource group associated with one of the first PUCCH resource ID or the multiple PUCCH resource IDs.

5. The method of claim 1, wherein a second value of the indication bit indicates for the spatial relation configuration of the first PUCCH resource to be updated based on the first PUCCH resource ID and the first spatial relation information included in the MAC CE and indicates for the spatial relation configuration of the plurality of PUCCH resources to not be updated based on the first PUCCH resource ID and the first spatial relation information included in the MAC CE.

6. The method of claim 1, wherein the first spatial relation information is indicated based on a bitmap corresponding to candidate spatial relation configurations.

7. The method of claim 1, wherein the plurality of PUCCH resources comprises the first PUCCH resource, the method further comprising:
receiving, for the plurality of PUCCH resources, a corresponding plurality of PUCCH resource configurations via radio resource control (RRC) signaling, wherein each PUCCH resource configuration of the plurality of PUCCH resource configurations comprises an indication that a corresponding PUCCH resource of the plurality of PUCCH resources is associated with the first PUCCH resource group, and wherein the updating of the spatial relation configuration of the plurality of PUCCH resources of the UE is based on the association of the plurality of PUCCH resources with the first PUCCH resource group.

8. An apparatus for wireless communication of a user equipment (UE), comprising:
memory; and
at least one processor coupled to the memory and configured to:
receive a medium access control (MAC) control element (CE) (MAC CE) indicating an update to a spatial relation configuration of a plurality of physical uplink control channel (PUCCH) resources of the UE for PUCCH transmissions, wherein the MAC CE includes a first PUCCH resource identifier (ID) that identifies a first PUCCH resource and is associated with a first PUCCH resource group in the plurality of PUCCH resources, wherein the MAC CE includes first spatial relation information, and wherein the MAC CE comprises a first value of an indication bit that indicates the update to the spatial relation configuration for a set of other PUCCH resources in the first PUCCH resource group associated with the first PUCCH resource ID, and wherein the MAC CE does not comprise a PUCCH resource ID that identifies a PUCCH resource in the set of other PUCCH resources in the first PUCCH resource group;
update, based on the first PUCCH resource ID and the first spatial relation information, the spatial relation configuration of the plurality of PUCCH resources of the UE; and
transmit a PUCCH transmission based on the updated spatial relation configuration.

9. The apparatus of claim 8, wherein the first spatial relation information identifies a first spatial relation configuration, wherein the first spatial relation configuration includes at least one of spatial settings or power control parameters.

10. The apparatus of claim 8, wherein the MAC CE includes multiple PUCCH resource IDs and respective spatial relation information, wherein updating the spatial relation configuration of the plurality of PUCCH resources of the UE is further based on the multiple PUCCH resource IDs and the respective spatial relation information;
wherein each of the multiple PUCCH resource IDs is associated with up to one respective PUCCH resource group and the plurality of PUCCH resources comprises PUCCH resources associated with any PUCCH resource group associated with one of the first PUCCH resource ID or the multiple PUCCH resource IDs.

11. The apparatus of claim 8, wherein a second value of the indication bit indicates for the spatial relation configuration of the first PUCCH resource to be updated based on the first PUCCH resource ID and the first spatial relation information included in the MAC CE and indicates for the spatial relation configuration of the plurality of PUCCH resources to not be updated based on the first PUCCH resource ID and the first spatial relation information included in the MAC CE.

12. The apparatus of claim 8, wherein the plurality of PUCCH resources comprises the first PUCCH resource, the at least one processor further configured to:
receive, for the plurality of PUCCH resources, a corresponding plurality of PUCCH resource configurations via radio resource control (RRC) signaling, wherein each PUCCH resource configuration of the plurality of PUCCH resource configurations comprises an indication that a corresponding PUCCH resource of the plurality of PUCCH resources is associated with the first PUCCH resource group, and wherein to update the spatial relation configuration of the plurality of PUCCH resources of the UE, the at least one processor is configured to update the spatial relation configuration of the plurality of PUCCH resources of the UE based on the association of the plurality of PUCCH resources with the first PUCCH resource group.

13. A method of wireless communication of a base station (BS), comprising:
transmitting a medium access control (MAC) control element (CE) (MAC CE) indicating an update to a spatial relation configuration of a plurality of physical uplink control channel (PUCCH) resources of a user equipment (UE) for PUCCH transmissions, wherein the MAC CE includes a first PUCCH resource identifier (ID) that identifies a first PUCCH resource and is associated with a first PUCCH resource group in the plurality of PUCCH resources, wherein the MAC CE includes first spatial relation information, and wherein the MAC CE comprises a first value of an indication bit that indicates the update to the spatial relation configuration for a set of other PUCCH resources in the first PUCCH resource group associated with the first PUCCH resource ID, and wherein the MAC CE does not comprise a PUCCH resource ID that identifies a PUCCH resource in the set of other PUCCH resources in the first PUCCH resource group; and receiving a PUCCH transmission based on an updated spatial relation configuration of the plurality of PUCCH resources of the UE, wherein the updated spatial relation configuration is based on the first PUCCH resource ID and the first spatial relation information.

14. The method of claim 13, wherein the first spatial relation information identifies a first spatial relation configuration, wherein the first spatial relation configuration includes at least one of spatial settings or power control parameters.

15. The method of claim 13, wherein the MAC CE includes multiple PUCCH resource IDs and respective spatial relation information, wherein the updated spatial relation configuration is further based on the multiple PUCCH resource IDs and the respective spatial relation information.

16. The method of claim 15, wherein each of the multiple PUCCH resource IDs is associated with up to one respective PUCCH resource group and the plurality of PUCCH resources comprises PUCCH resources associated with any PUCCH resource group associated with one of the first PUCCH resource ID or the multiple PUCCH resource IDs.

17. The method of claim 13, wherein second value of the indication bit indicates for the spatial relation configuration of the first PUCCH resource to be updated based on the first PUCCH resource ID and the first spatial relation information included in the MAC CE and indicates for the spatial relation configuration of the plurality of PUCCH resources to not be updated based on the first PUCCH resource ID and the first spatial relation information included in the MAC CE.

18. The method of claim 13, wherein the first spatial relation information is indicated based on a bitmap corresponding to candidate spatial relation configurations.

19. The method of claim 13, further comprising:
generating the MAC CE indicating the update to the spatial relation configuration of the plurality of PUCCH resources of the UE for the PUCCH transmissions.

20. The method of claim 13, wherein the plurality of PUCCH resources comprises the first PUCCH resource, the method further comprising:
transmitting, for the plurality of PUCCH resources, a corresponding plurality of PUCCH resource configurations via radio resource control (RRC) signaling, wherein each PUCCH resource configuration of the plurality of PUCCH resource configurations comprises an indication that a corresponding PUCCH resource of the plurality of PUCCH resources is associated with the first PUCCH resource group, and wherein the updated of the spatial relation configuration of the plurality of PUCCH resources of the UE is based on the association of the plurality of PUCCH resources with the first PUCCH resource group.

21. The method of claim 20, wherein the first PUCCH resource group is not explicitly configured, and wherein the first PUCCH resource group is indicated based on the corresponding plurality of PUCCH resource configurations.

22. An apparatus for wireless communication of a base station, comprising:
memory; and
at least one processor coupled to the memory and configured to:
transmit a medium access control (MAC) control element (CE) (MAC CE) indicating an update to a spatial relation configuration of a plurality of physical uplink control channel (PUCCH) resources of a user equipment (UE) for PUCCH transmissions, wherein the MAC CE includes a first PUCCH resource identifier (ID) that identifies a first PUCCH resource and is associated with a first PUCCH resource group in the plurality of PUCCH resources, wherein the MAC CE includes first spatial relation information, and wherein the MAC CE comprises a first value of an indication bit that indicates the update to the spatial relation configuration for a set of other PUCCH resources in the first PUCCH resource group associated with the first PUCCH resource ID, and wherein the MAC CE does not comprise a PUCCH resource ID that identifies a PUCCH resource in the set of other PUCCH resources in the first PUCCH resource group; and receive a PUCCH transmission based on an updated spatial relation configuration of the plurality of PUCCH resources of the UE, wherein the updated spatial relation configuration is based on the first PUCCH resource ID and the first spatial relation information.

23. The apparatus of claim 22, wherein the first spatial relation information identifies a first spatial relation configuration, wherein the first spatial relation configuration includes at least one of spatial settings or power control parameters.

24. The apparatus of claim 22, wherein the MAC CE includes multiple PUCCH resource IDs and respective spatial relation information;
wherein each of the multiple PUCCH resource IDs is associated with up to one respective PUCCH resource group and the plurality of PUCCH resources comprises PUCCH resources associated with any PUCCH resource group associated with one of the first PUCCH resource ID or the multiple PUCCH resource IDs; and
wherein the updated spatial relation configuration is further based on the multiple PUCCH resource IDs and the respective spatial relation information.

25. The apparatus of claim 22, wherein the at least one processor is further configured to:
generate the MAC CE indicating the update to the spatial relation configuration of the plurality of PUCCH resources of the UE for the PUCCH transmissions.

26. The apparatus of claim 17, wherein the plurality of PUCCH resources comprises the first PUCCH resource, the at least one processor further configured to:
transmit, for the plurality of PUCCH resources, a corresponding plurality of PUCCH resource configurations via radio resource control (RRC) signaling, wherein each PUCCH resource configuration of the plurality of PUCCH resource configurations comprises an indication that a corresponding PUCCH resource of the plurality of PUCCH resources is associated with the first PUCCH resource group, and wherein the updated of the spatial relation configuration of the plurality of PUCCH resources of the UE is based on the association of the plurality of PUCCH resources with the first PUCCH resource group.

27. The apparatus of claim 26, wherein the first PUCCH resource group is not explicitly configured, and wherein the first PUCCH resource group is indicated based on the corresponding plurality of PUCCH resource configurations.

* * * * *